June 17, 1958 — D. S. RIDLER ET AL — 2,839,605

TELEGRAPH REPEATERS

Filed June 24, 1953 — 4 Sheets-Sheet 1

Inventor
D. S. RIDLER - D. A. WEIR
By R. R. Morris
Attorney

Inventor
D. S. RIDLER- D.A. WEIR
By [signature]
Attorney

Inventor
D. S. RIDLER - D. A. WEIR
By R. P. Morris
Attorney

June 17, 1958 D. S. RIDLER ET AL 2,839,605

TELEGRAPH REPEATERS

Filed June 24, 1953 4 Sheets-Sheet 4

Inventor
D. S. RIDLER - D. A. WEIR
By [signature]
Attorney

United States Patent Office 2,839,605

Patented June 17, 1958

2,839,605

TELEGRAPH REPEATERS

Desmond Sydney Ridler and Donald Adams Weir, London, England, assignors to International Standard Electric Corporation, New York, N. Y.

Application June 24, 1953, Serial No. 363,846

Claims priority, application Great Britain June 27, 1952

7 Claims. (Cl. 178—71)

This invention relates to telegraph systems for half-duplex working between two stations.

By "half-duplex" working is meant a system of telegraph communication in which signalling may take place in either direction alternately but not simultaneously.

Where regenerators are used on half-duplex circuits it is economical to use a single regenerator switched to whichever end is sending.

According to the present invention a telegraph system for half-duplex working between two stations comprises a regenerator repeater and means for automatically connecting said regenerator repeater to regenerate signals from whichever of the two stations is sending and to retransmit the regenerated signals to the other station.

When start-stop teleprinter signalling is used between the two stations it is convenient to arrange that the start element of a signal combination sent from either station is effective to connect the regenerator to receive subsequent signal elements from that station.

The invention may be adapted for the use of a regenerator in a telegraph exchange system, since a connection established between two stations in such a system is usually used for half-duplex working. It is desirable that the establishment of a connection should take place independently of the regenerator repeater and accordingly the invention is described in relation to a telegraph exchange system and arrangements are described whereby the connection between one station and the exchange is established over a line independently of the regenerator repeater, the dialling signals being sent over the line without passing through the regenerator and the latter being switched into the line only upon the connection to the wanted station being established.

An embodiment of the invention will now be described with reference to the accompanying drawings of which:

The operation of the system will now be described, the various components being introduced as they come into use.

Figure 1:
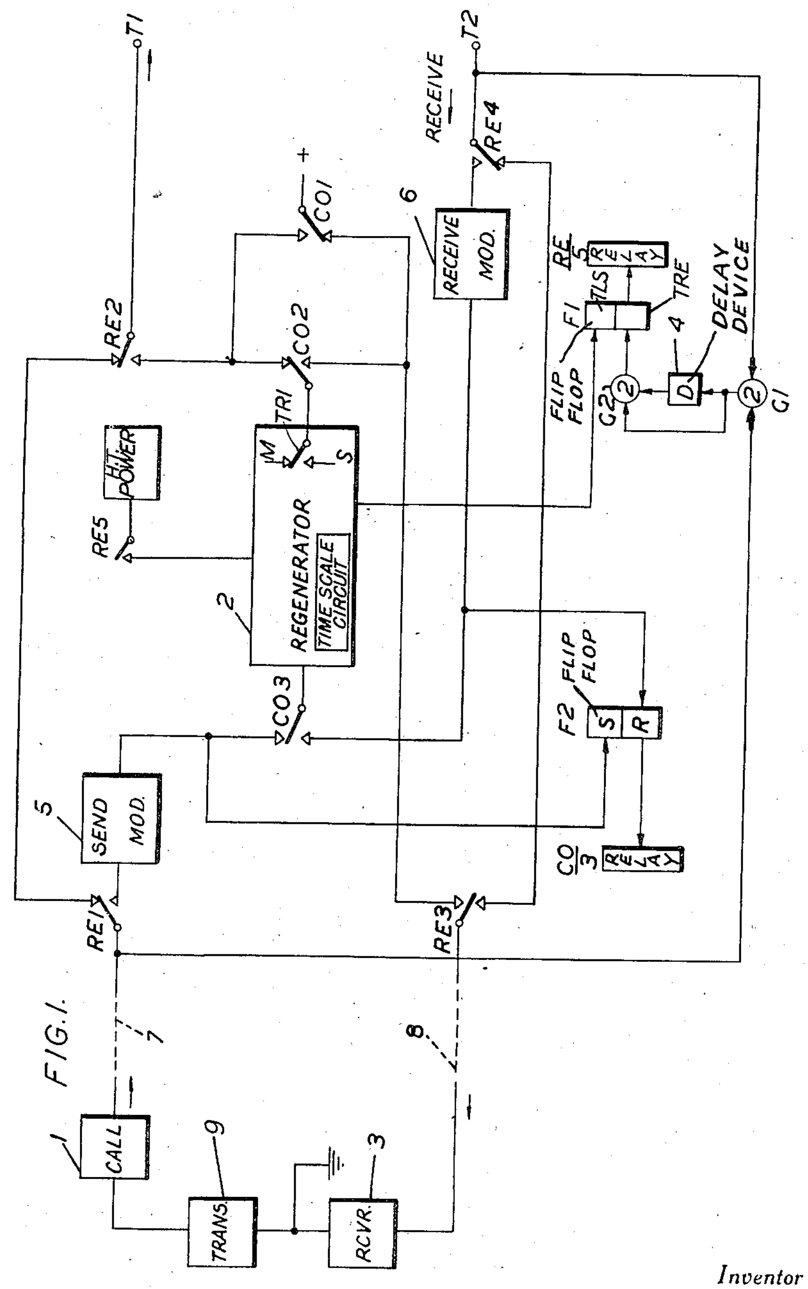
Fig. 1 shows a block schematic diagram of a line in a telegraph exchange system adapted for half-duplex working, connections of said line to one station, a single regenerator and automatic switching arrangements for switching in said regenerator into said line and for automatically connecting said regenerator to repeat signals in one direction or the other.

Referring to Fig. 1, when the operator at the station shown wishes to call the exchange he operates a key on his call or control box 1. The call box 1 is a switch capable of applying a characteristic condition to the line and which condition may be sensed at the exchange by an operator or a line finder in a manner similar to the detection of a calling party in a dial telephone system. A characteristic condition can be the application of a potential of a particular polarity or the reversal of an existent polarity or the removal of a potential. In the ensuing description it will be assumed that no current is normally present on the line and that actuation of the switch in the control box 1 will apply potential to the line. This causes the suspension of the normal condition (space) and sends a long mark signal to the exchange (not shown) via contacts RE1 and RE2 (by-passing the regenerator 2) and terminal T1.

On receipt of this long mark signal, the exchange sends back a "proceed-to-dial" signal consisting of an interval of mark lasting less than 100 milliseconds. This may be considered to arrive at terminal T2 from whence it passes via contacts RE4 and RE3 (again by-passing regenerator 2) to the teleprinter receiver 3. This results (by means well known in the art) in the starting of the teleprinter motor thus giving an indication that the operator may begin dialling.

The proceed-to-dial signal also passes to a gating device G1 requiring two inputs for it to function. A gating device of this type is disclosed in U. S. Patent No. 2,498,986 granted February 28, 1950. The other input is supplied to gate G1 when a mark signal is proceeding from the control box 1 (as it is in this case). Coincidence gates are shown as circles with incoming controls shown as radial leads with arrowheads touching the circles. The output is shown as a radial lead with the arrowhead pointing outwards. The number inside the circle indicates the total number of controls which must be energized for the gate to deliver an output; for instance, if, as in the gate G1 there are two controls, and the number in the circle is 2, then the gate will deliver an output when both of its controls are energized. Gates are indicated by the letter G followed by a reference numeral. The output from gate G1 is supplied over two paths to a gate G2, one of these paths providing a direct connection and the other path containing a 100 milliseconds delay device 4. In order that gate G2 shall provide an output both input conditions have to be supplied simultaneously and it will be apparent that this can only occur if gate G1 is opened for 100 milliseconds or longer corresponding to the delay period of delay device 4. Since the proceed-to-dial signal does not last for 100 milliseconds, gate G2 does not open in response thereto.

The operator at the sending station shown now proceeds to dial, transmitting dialling pulses (space) of 60 milliseconds duration separated by intervals (mark) of 40 milliseconds duration. When dialling has been completed the line is left in the mark condition.

As soon as contact with the wanted teleprinter station has been established through the exchange, a mark signal is returned over terminal T2. This mark signal persists for at least 100 milliseconds and so at the end of that period gate G2 opens and changes over a two-condition device F1, commonly known as a flip-flop comprising, for example, a pair of gas-filled electric discharge devices interconnected in well known manner whereby the conduction of either discharge device effects the extinction of its partner. Initially F1 is in the condition where device (or tube) TLS is fired. When gate G2 opens, tube TRE is fired and TLS extinguished. This causes the energisation of a regenerator insertion relay RE having five contacts, four of which have already been referred to in passing.

Contacts RE1 to RE4 complete the telegraph circuit through the regenerator 2 and contact RE5 switches power onto the regenerator e. g. by completing the H. T. power supply in the case of an electronic regenerator.

It will be seen that the selection signals including the proceed-to-dial signal are by-passed around the regenerator 2 by the contacts RE1 . . . RE4 and only upon the firing of tube TRE will signals be applied to the input of the regenerator.

It should be noted that the line connected to terminal T1 in Fig. 1 is connected at the distant station by a connection similar to line 8 to the teleprinter receiver at that station, whilst the teleprinter transmitter at such station is connected over a line to terminal T2 in Fig. 1.

The operator at the station shown can now use his teleprinter transmitter 9 to transmit to the distant station, the transmission path being via contact RE1 (in the lower position), a sending modulator 5, back contact CO3, regenerator 2 with output contacts TR1, back contact CO2, contact RE2 and terminal T1. The modulator 5 may be of the type disclosed in U. S. Patent 2,787,657, granted April 2, 1957.

At the same time, back contact CO1 applies a mark condition via front contact RE3 to hold the electromagnet of the teleprinter receiver 3.

It may here be noted that in the circuits shown a mark condition is represented by positive potential and space condition by negative potential which are the opposite conditions from those used in the United Kingdom. The changes necessary for using the opposite potentials are, however, obvious.

When signalling is completed, the operator at the station shown sends the conventional long space signal which is regenerated and a corresponding pulse applied to fire the long space tube LS of device F1 thereby extinguishing tube TRE. This causes relay RE to de-energise and change contacts RE1—RE5 back to their initial conditions as shown in Fig. 1.

Figure 2:
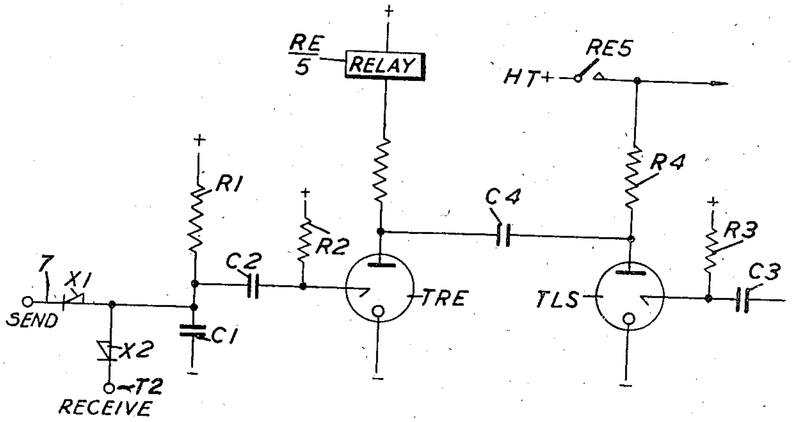
Fig. 2 shows a practical form of circuit for switching the regenerator into operation once a call has been established.

In Fig. 2 is shown a circuit diagram of a practical form which the device F1 and gates G1 and G2 may take.

The gate G1 comprises two rectifiers X1 and X2 connected to conductor 7 and terminal T2 respectively. During the spacing condition it is assumed that their two terminals remote from the junction point are maintained at a negative potential while during the marking condition these terminals are made positive.

The gate G2 comprises a resistor R1 and a capacitor C1. The time constant of this combination is 100 milliseconds.

As long as either the send or receive leg is connected to space (negative) potential the lower end of resistor R1 is maintained at a negative potential and capacitor C1 remains uncharged.

When both the send and receive legs are at mark, rectifiers X1 and X2 are simultaneously blocked and capacitor C1 starts to charge up through resistor R1.

If either the send or receive leg reverts to the spacing condition before 100 milliseconds, capacitor C1 discharges via rectifier X1 or X2 as the case may be.

At the conclusion of 100 milliseconds, provided the send and receive legs are still at mark, the rise in potential across the charged capacitor C1 is sufficient to send a positive pulse forward via capacitor C2 to the trigger electrode of a three-electrode cold-cathode tube TRE forming one part of the two-condition device F1. This tube is already "primed" by a potential applied over a resistor R2 and the aforesaid pulse is sufficient to fire tube TRE. Relay RE, being in the anode circuit of the tube is thus energised to perform the functions already mentioned.

When the long space signal is transmitted at the conclusion of signalling, the regenerator supplies a pulse which is applied via a capacitor C3 to the trigger electrode of tube TLS forming the other part of device F1. Tube TLS is already primed via resistor R3 and is thus fired by this pulse. As tube TLS starts to conduct, its anode potential falls by virtue of its anode load resistor R4 and this results in the sending of a negative pulse via capacitor C4 to the anode of tube TRE. The time constant of R3—C3 is such that it requires a long space signal to trigger tube TLS, thereby rendering tube TLS immune from triggering upon receipt of ordinary length space signals incident to normal signalling, such space signals having a duration of 20 ms. This latter tube is thus extinguished and relay RE de-energises.

So far it has been assumed that transmission only takes place in one direction, viz, from teleprinter transmitter 9 (Fig. 1) to a receiver at a distant station not shown.

When the distant station begins to transmit, the first signal condition to be received at terminal T2 is the start or space element preceding the first signal combination. This passes through the receive modulator 6 and as a result a pulse is passed to the "receive" tube R of a two-condition device F2 similar to F1. This changes over the flip-flop device F2 and energises a relay CO having three contacts.

Contacts CO3 and CO2 change over to complete a circuit from the receive modulator through the regenerator and, from the output of the regenerator via contact RE3 to the receiver 3 of the station shown.

Contact CO1 changes over to apply a mark holding potential via terminal T1 to the distant teleprinter receiver.

As long as the distant station continues transmitting the foregoing condition obtains but as soon as transmitting from the local end is resumed, the first start element changes back F2 into its initial condition by firing tube S. Relay CO de-energises and the contacts CO1, 2 and 3 resume their original positions. Thus the regenerator 2 is always switched in the correct direction according to which end is transmitting.

In practice in order to make the best use of the regenerator, it would preferably be located somewhere about half way between the two communicating stations. This has been signified in Fig. 1 by the inclusion of the dotted lines 7 and 8 connecting the teleprinter station shown with the regenerator and its associated switching circuits.

The switching of the regenerator from send to receive condition, i. e. the function of the relay contacts CO2 and CO3 of Fig. 1 may be performed electronically in the manner explained below with reference to Fig. 4 if two telegraph relays TRA and TRB are provided. The contacts only of these relays are shown in Fig. 3.

Figure 3:
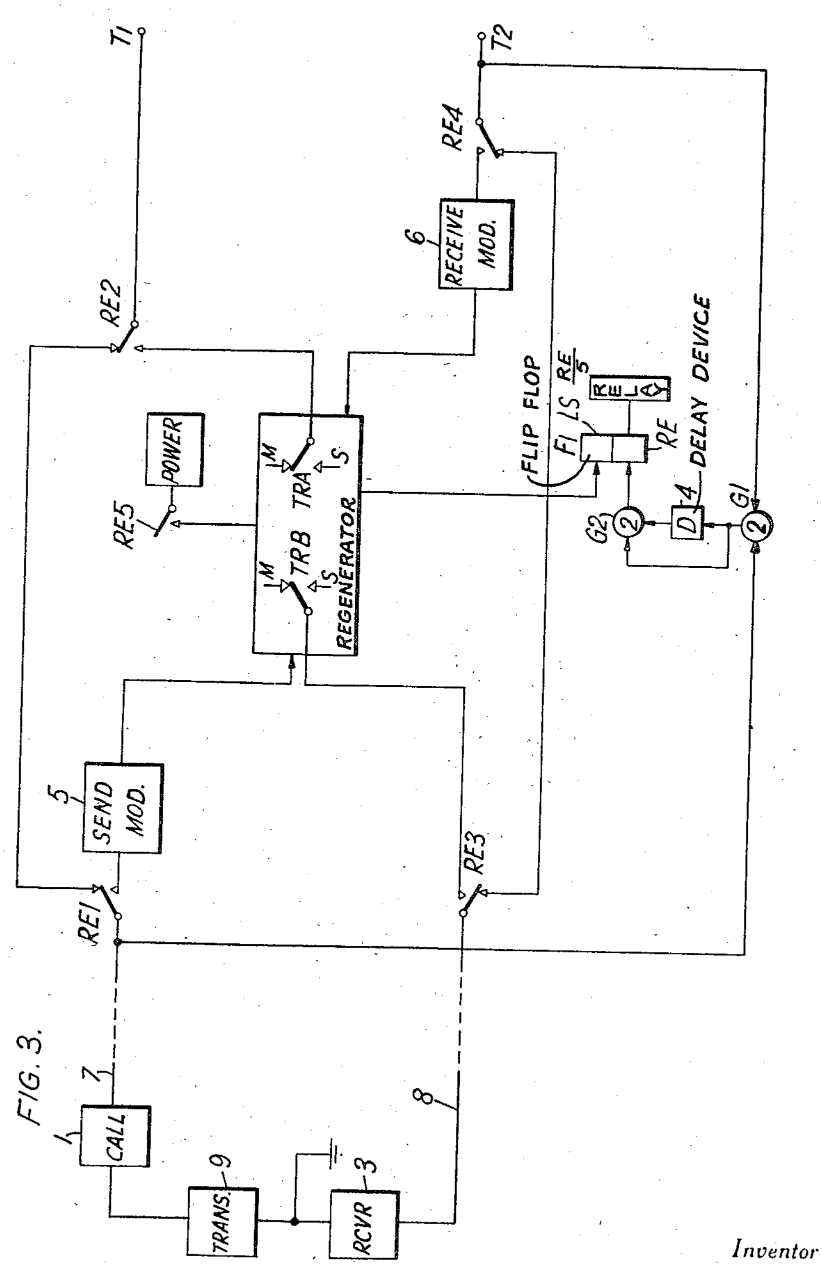
Fig. 3 is a modified form of Fig. 1 for use with purely electronic means for switching the regenerator according to the direction of transmission.

The regenerator 2 in Figs. 1 and 3 is assumed to be of the kind described and claimed in U. S. Patent 2,787,657, granted April 2, 1957. This regenerator has an output two-condition device comprising two gas-filled tubes each of these controlling a respective winding of an output telegraph relay. In the regenerator described in the above-mentioned U. S. Patent 2,787,657 a single modulator controls the output device, but to enable the regenerator to be used for either direction of traffic, separate send and receive modulators 5 and 6 are used as shown in Figs. 1 and 3. Both modulators are used to act on a single output device in the arrangement shown in Fig. 1 but in the arrangement shown in Figs. 3 and 4 two separate output devices are used.

Figure 4:
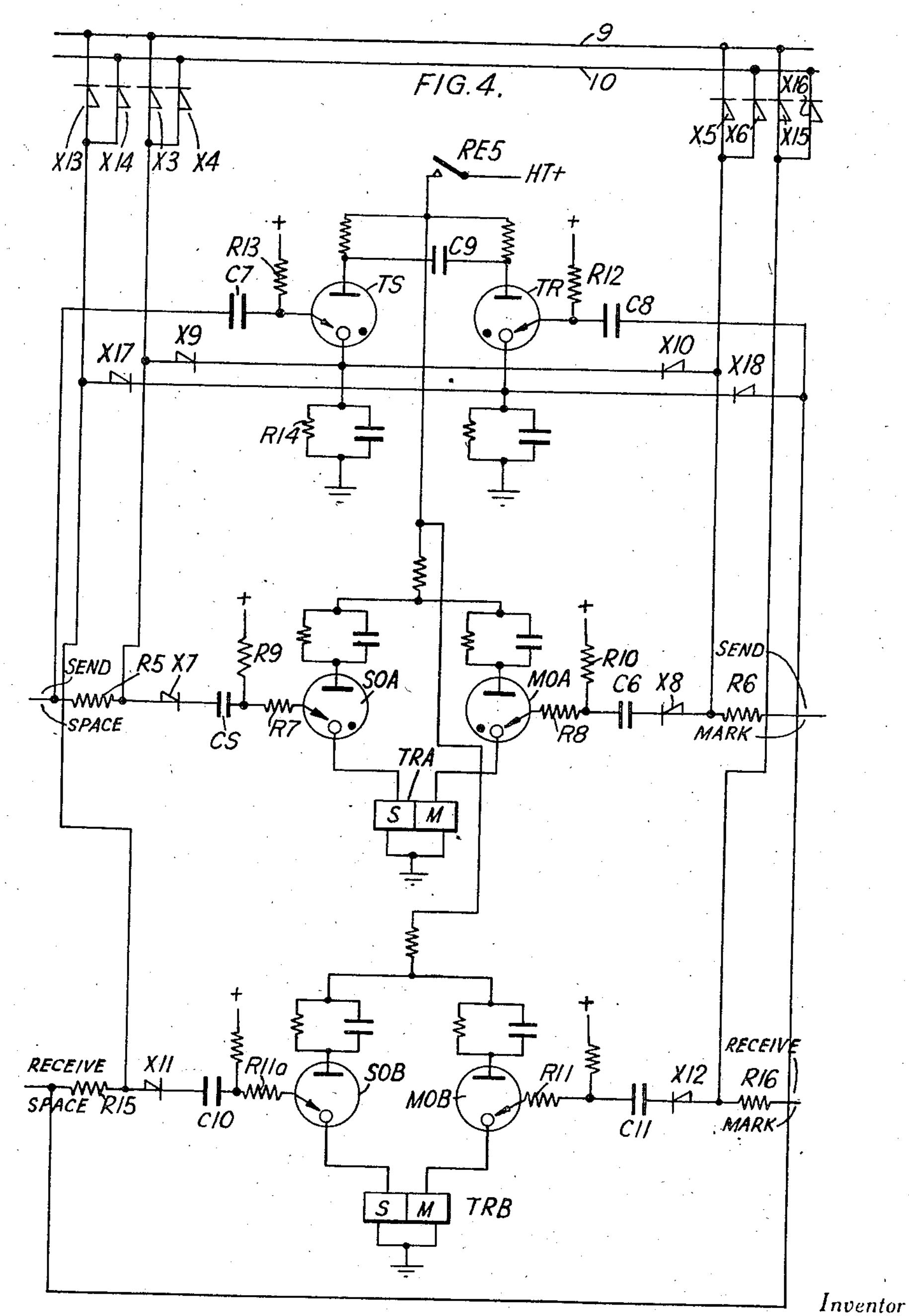
Fig. 4 is a circuit for such electronic switching means.

The output device acted on by the send modulator consists of two tubes SOA and MOA, Fig. 4, the tube SOA being operated to send a space and MOA to send a mark by affecting the windings of a telegraph relay TRA. Consequently the space lead from the send modulator is connected to the trigger electrode of tube SOA and the mark lead to the trigger electrode of tube MOA.

Considering the sending modulator 5 only for the moment, this is arranged to deliver positive going pulses via resistor R5 during space signals and similar pulses via resistor R6 during mark signals.

These pulses pass over resistor R5 or over resistor R6 and over capacitor C5 and resistor R7, or over capacitor C6 and resistor R8, to the trigger electrode of the cold cathode gas filled tube SOA or to the trigger electrode of the cold cathode gas filled tube MOA, when they are rendered effective for that purpose.

As described in the above mentioned U. S. Patent 2,787,657 pulses present on the side of the resistor R5 adjacent to the rectifier X7 are normally shunted to earth over either or both of rectifiers X3 and X4 and bus bars 9 and 10. A time scale circuit in the regenerator is started up by the appearance of a pulse on the space lead at the left hand side of resistors R5 where a potential pulse is not short circuited.

Thereafter at intervals of 10, 30, 50, 70, 90 and 110 milliseconds from the starting up of the time scale circuit, i. e. at the theoretical centres of the start element and the five permutable elements positive blocking potentials are applied simultaneously to the conductors 9 and 10 thereby blocking rectifiers X3 and X4, and allowing pulses to pass through rectifier X7, capacitor C5 and resistor R7 to the trigger electrode of tube SOA. In this way any spacing element received fires the tube SOA and extinguishes the tube MOA if it was previously fired. The spacing winding of relay TRA is thus operated to cause its contacts to apply spacing potential to the outgoing line.

The mark conductor from the send modulator 5 is connected over resistor R6, rectifier X8, capacitor C6 and resistance R8 to the trigger electrode of the mark output tube MOA. Pulses are applied to this mark conductor when the signalling potential applied to the send modulator is mark. A point between resistor R6 and rectifier X8 is connected to conductors 9 and 10 over rectifiers X5 and X6 respectively. In this way pulses on the mark conductor from the send modulator are short circuited to earth except at the times above mentioned at which blocking potential is applied to conductors 9 and 10 from the time scale circuit.

As shown in Figs. 1 and 3 a second modulator, a receive modulator 6 is employed. This receive modulator is of the same kind as the send modulator. The mark and space conductors leading from the receive modulator are shown in Fig. 4. The mark conductor is connected over resistor R16 and rectifier X12 and over a capacitor C11 and, a resistor R11 to the trigger electrode of a mark output tube MOB, whilst the space conductor of the receive modulator is connected over resistor R15, rectifier X11, over a capacitor C10 and a further resistor R11*a* to the trigger electrode of a space output tube SOB. The junction between resistor R15 and rectifier X11 is connected to conductors 9 and 10 over rectifiers X13 and X14 respectively. The junction between resistor R16 and rectifier X12 is connected to conductors 9 and 10 over rectifiers X15 and X16 respectively. The time scale circuit by placing potentials on conductors 9 and 10 thus controls the examination of the signals received over the receive modulator as well as those received over the send modulator. The output tubes SOB and MOB control a separate telegraph relay TRB.

Fig. 4 shows a pair of interconnected cold cathode tubes TS and TR which act as a switch to determine whether signals from the send modulator or from the receive modulator shall be regenerated by the regenerator.

When a start element is received from the send modulator a pulse appears on the space conductor from that modulator. Although the right hand end of resistor R5 in Fig. 4 is shorted over rectifiers X3 and X4 to ground on conductors 9 and 10 the pulse raises the potential of the left hand end of resistor R5, sufficiently for the pulse to be passed over capacitor C7 to the trigger electrode of tube TS and is sufficient, added to the bias applied over resistor R13, to fire the tube TS, if that tube was not originally fired. The cathode of tube TS is connected to ground over a resistor R14 shunted by a capacitor. The right hand end of resistor R5 is connected to the cathode of tube TS over a rectifier X9 so poled that with tube TS unoperated the right hand end of resistor R5 is connected to ground via resistor R14, in the same way as it is connected to ground over rectifiers X3 and X4. Thus with tube TS unoperated pulses on the space conductor from the send modulator cannot operate the output tube SOA. When tube TS is fired however, the potential of the cathode end of resistor R14 is raised after the capacitor in parallel therewith has charged up, to block rectifier X9 and remove this short circuit to ground.

The cathode of tube TS is connected in a similar manner to the left hand end of resistor R6 in the mark conductor of the send modulator and with tube TS unoperated pulses on the mark conductor from the send modulator are short circuited to ground and cannot operate the output tube MOA, but with tube TS fired this short circuit is removed.

The trigger electrode of tube TR is connected to the space conductor from the receive modulator over capacitor C8 in the same way as is the trigger electrode of tube TS to the space conductor from the send modulator. The anodes of tubes TS and TR are connected together through a capacitor C9 so that when one tube is fired the other is extinguished.

Thus when a start element of a signal combination causes a pulse to appear on the space conductor from the receive modulator the tube TR is fired and the tube TS extinguished.

When tube TR is unfired the connection of its cathode circuit to ground short circuits the rectifier X12 in the mark conductor from the receive modulator over rectifier X18 and the rectifier X11 in the space conductor from the receive modulator over X17 but when the tube TR is fired these short circuits are removed, and the rectifiers X17 and X18 are blocked.

Thus the output circuit SOA, MOA is rendered effective when a start element of a signal reaches the send modulator and the relay TRA operates its contacts shown in Fig. 3 to send the start element and subsequent signals to terminal T1. During this condition the output circuit SOB, MOB is rendered ineffective and this circuit and the relay TRB operated therefrom are left in the mark condition. In this condition contacts of TRB connect mark potential to the receiver 3 of the station shown in Fig. 3.

When signalling from the station shown in Fig. 3 ceases the relay TRA is in the mark condition and the output circuit SOA, MOA remain in that condition.

When a start element is received over the receive modulator the tube TR is fired as described above and the receive modulator becomes effective to operate the output circuit SOB, MOB and through it the relay TRB whilst the send modulator is ineffective to influence the output circuit SOA, MOA. The contacts of relay TRA are left connecting mark potential to terminal T1 and so to the receiver of the distant station.

While the principles of the invention have been described above in connection with specific embodiments, and particular modifications thereof, it is to be clearly understood that this description is made only by way of example and not as a limitation on the scope of the invention.

What we claim is:

1. A circuit for a half-duplex telegraph working between two telegraph stations separated by a central switching exchange, each station comprising a pair of communication channels extending to said exchange, one of said channels for transmitting signals and the other for receiving signals, a regenerative repeater adapted to be taken into use by either of said stations and to repeat regenerated telegraph signals to the other of said stations, by-pass connection means for normally by-passing said repeater and interconnecting said channels to said exchange switch means for switching said by-pass means out of by-pass relation with said repeater and for interconnecting said stations with said repeater, said switch means comprising means responsive to a joint signal from said other station having a particular characteristic and to a signal from the transmitting station having a particular characteristic.

2. Telegraph system as claimed in claim 1 for start-stop signalling in which said switch means comprises means operative upon the arrival of a start element of a telegraph signal combination from one or the other direction.

3. Telegraph system as claimed in claim 2 wherein said switch means further comprises first and second modulators each adapted to cause pulses to appear upon respective mark and space conductors according to the kind of signal element being received from a station, means operative upon a pulse appearing on the space conductor of one of said modulators to start a time scale circuit in said regenerator repeater into operation and to condition said regenerator repeater to examine the condition of the mark and space conductors of the modulator to which said space conductor is connected at times measured by said time scale circuit and to retransmit signal elements determined thereby.

4. Telegraph system as claimed in claim 3 further comprising separate output circuits, each connected to be operated by mark and space conductors from a separate one of said modulators a static two-condition electric switch connected to said separate output circuits so as to disable one or the other of said output circuits according to the condition of said switch and means for operating said switch into one or other of said conditions on the arrival of a start element of a telegraph signal at the appropriate modulator.

5. Telegraph exchange system comprising a regenerative repeater for telegraph signals associated with a line connecting a station to an exchange, means for sending selection signals independently of said repeater from said station to the exchange for establishing a connection to another station, switching means effective upon the establishment of such connection for connecting said repeater in said line, a gate circuit for applying an electric potential to operate said switching means, means for generating said electric potential only upon the passage of current in both directions in said line for a period exceeding a given minimum duration and means for automatically conditioning said repeater to repeat telegraph signals in each direction in turn.

6. A circuit as claimed in claim 5 further comprising re-set means coupled between said switching means and said repeater, said re-set means under control of said repeater and responsive to a repeated signal having a predetermined duration, said re-set means adapted to restore said switching means to its original condition.

7. A circuit as claimed in claim 5, wherein said gate circuit comprises a pair of two-input coincidence gate elements and a delay device, a first of said gate elements having each of its inputs connected to a different one of said stations the output of said first gate element connected to a first input of said second gate element directly and serially through said delay device to the second input of said second gate element, said delay device having a response characteristic equal to said period.

References Cited in the file of this patent

UNITED STATES PATENTS

| | | |
|---|---|---|
| 1,908,574 | Trechcinski | May 9, 1933 |
| 2,055,575 | Herman | Sept. 29, 1936 |
| 2,476,864 | Hearn et al. | July 19, 1949 |